(12) United States Patent
Giraud

(10) Patent No.: US 6,484,616 B1
(45) Date of Patent: Nov. 26, 2002

(54) CARTRIDGE CASE PREPARATION DEVICE

(76) Inventor: Douglas Giraud, 1711 Carriage Way, Sugar Land, TX (US) 77478

( * ) Notice: Subject to any disclaimer, the term of this patent is extended or adjusted under 35 U.S.C. 154(b) by 0 days.

(21) Appl. No.: 09/981,366

(22) Filed: Oct. 17, 2001

(51) Int. Cl.[7] ............................................... B21D 51/54
(52) U.S. Cl. ............................. 86/19.7; 86/19.5; 86/23
(58) Field of Search ................................. 86/19.7, 23

(56) References Cited

U.S. PATENT DOCUMENTS

| | | | | |
|---|---|---|---|---|
| 3,705,515 A | * | 12/1972 | Lee | 72/370.13 |
| 3,863,529 A | * | 2/1975 | Bolen | 82/47 |
| 3,890,682 A | * | 6/1975 | Eckstein | 82/125 |
| 3,908,253 A | * | 9/1975 | Bolen | 82/70.2 |
| 4,405,269 A | * | 9/1983 | Hertzler | 408/211 |
| 4,686,751 A | | 8/1987 | Gracey | |
| 4,742,606 A | * | 5/1988 | Burby et al. | 408/127 |
| 5,200,571 A | | 4/1993 | Gracey | |
| 5,309,813 A | * | 5/1994 | Henley | 83/13 |
| 5,497,539 A | * | 3/1996 | Blodgett et al. | 408/112 |
| 5,649,464 A | * | 7/1997 | Gracey | 408/224 |
| 5,727,295 A | * | 3/1998 | Gracey | 82/113 |
| 5,788,429 A | * | 8/1998 | Gracey | 408/234 |

OTHER PUBLICATIONS

Dillon's Rapid Trim 1200B Care Trimmer Forster Products Combination Case Length & Headspace., Wilson Gages.

Forster Original Care Trimmer Gracey Power Care Trimmer with Motor.

* cited by examiner

Primary Examiner—Charles T. Jordan
Assistant Examiner—Bret Hayes
(74) Attorney, Agent, or Firm—Kurt J. Brown

(57) ABSTRACT

Described are devices used to manufacture or assemble firearm ammunition using either new or used metallic cartridge cases. Specifically, these devices combine the necessary means to trim cartridge cases to a predetermined length while removing burrs and chambering both the inside and outside of the case mouth, removing cartridge case material used to crimp primers into the cartridge case by swaging, cutting the cartridge case primer pocket to a predetermined depth, chambering both the inside and outside surface of the cartridge case flash hole, and trimming the wall thickness of the cartridge case neck to a uniform dimension, all with the same device and by a manner that increases convenience and accuracy over any other means currently available.

22 Claims, 11 Drawing Sheets

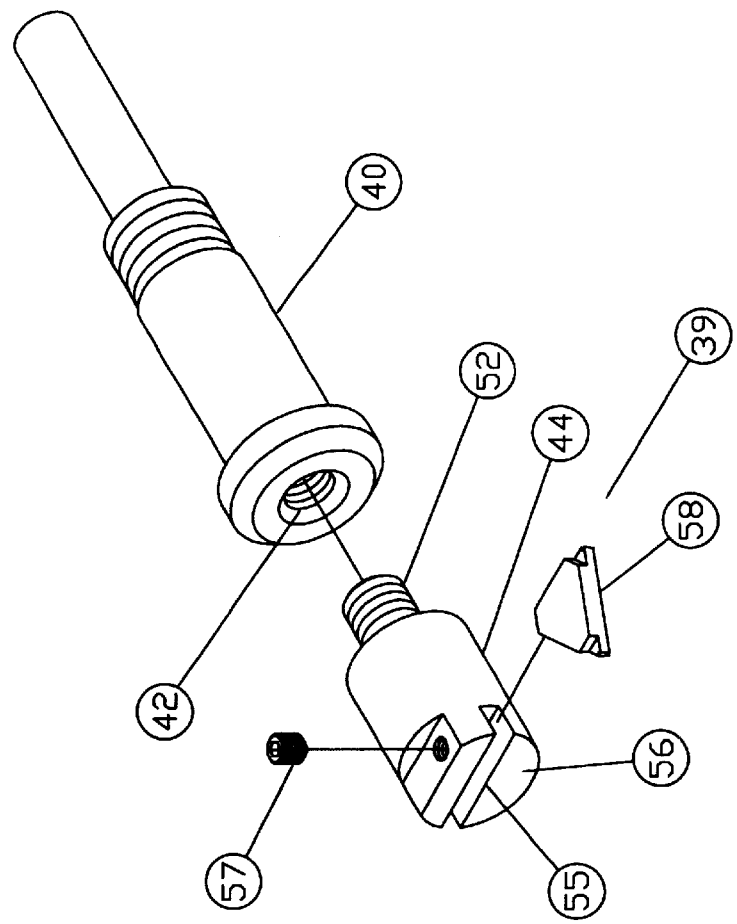
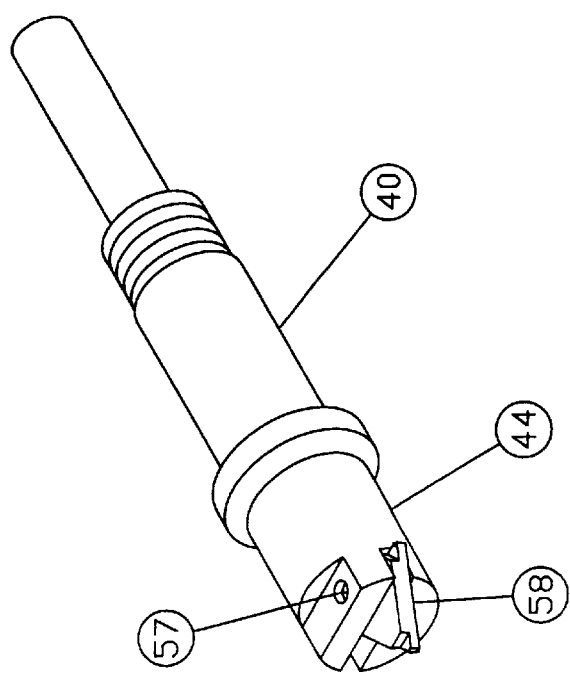
FIGURE 6

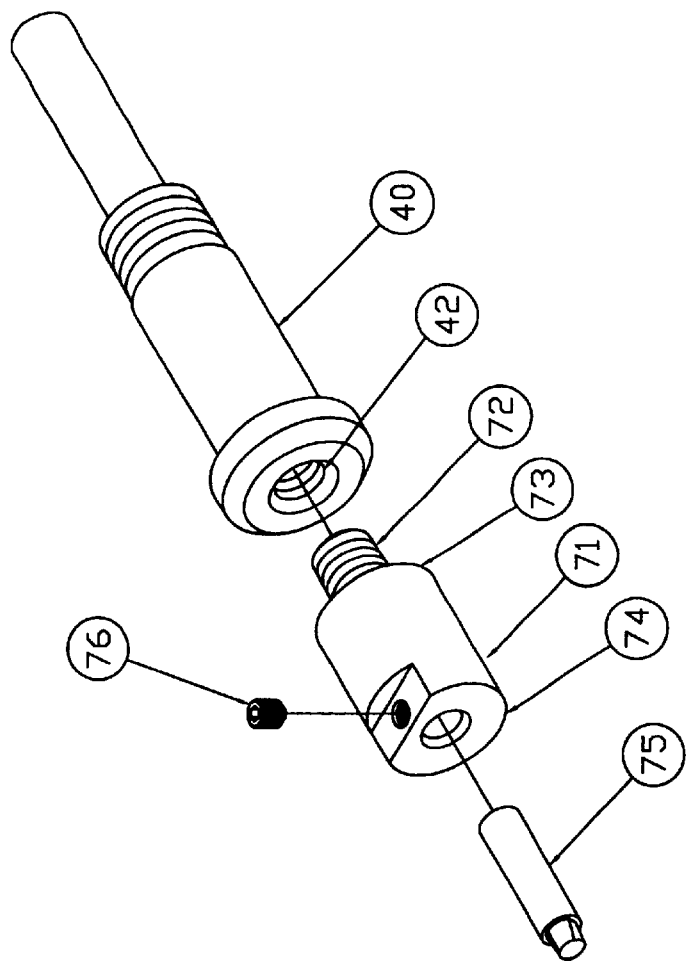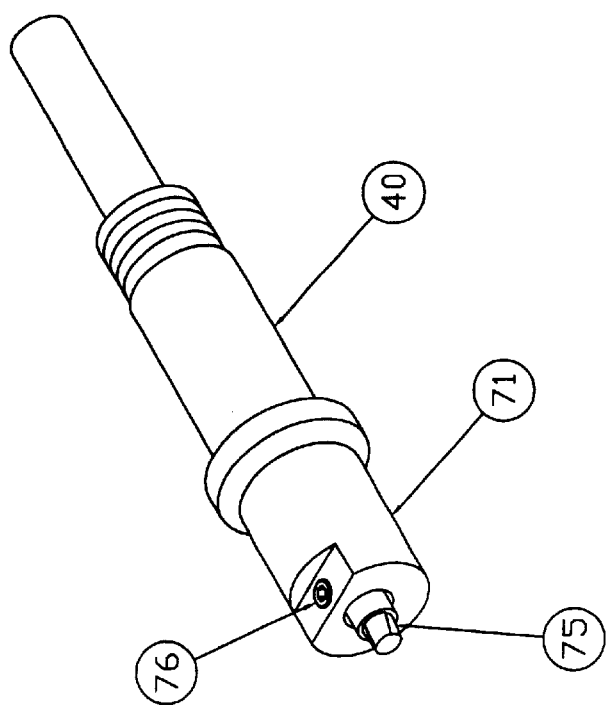
FIGURE 7

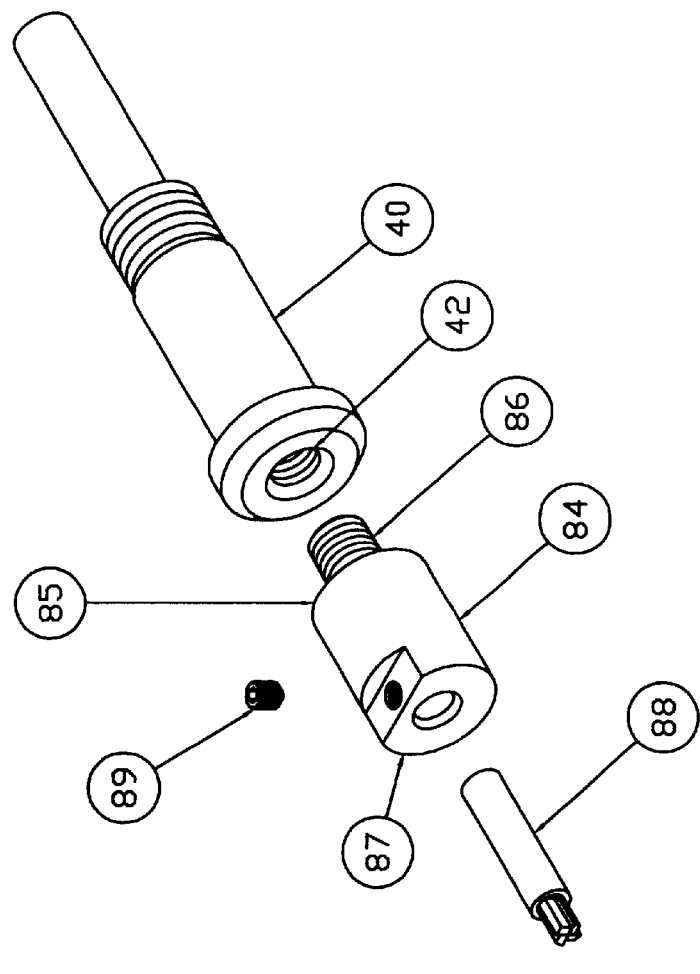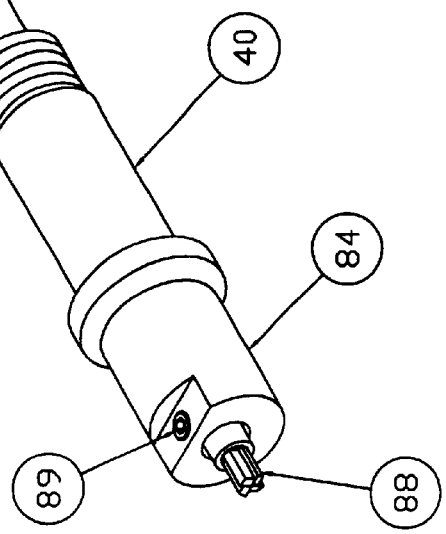
FIGURE 9

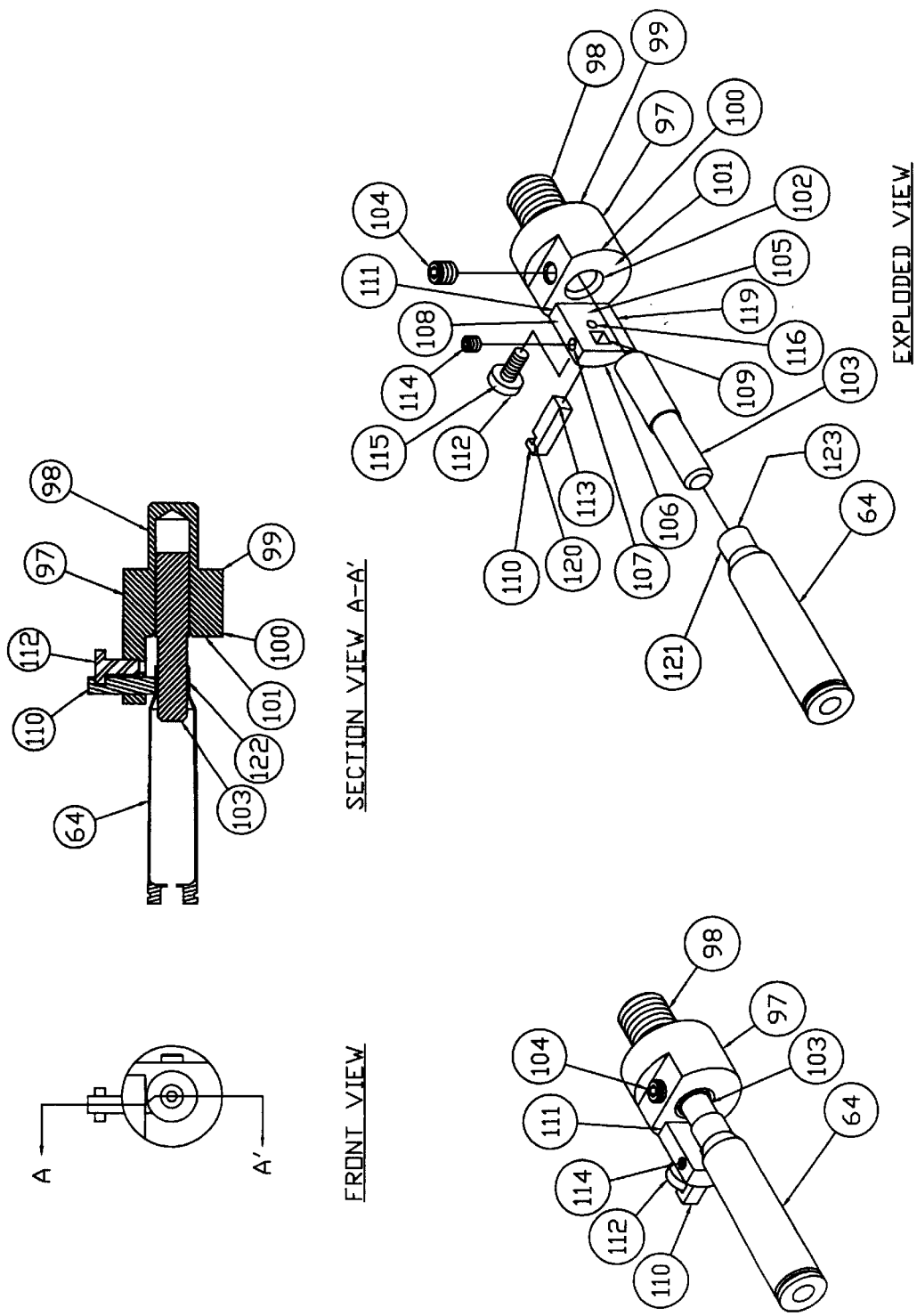

CARTRIDGE CASE PREPARATION DEVICE

BACKGROUND OF THE INVENTION

This invention relates to devices used to manufacture or assemble firearm ammunition using either new or used metallic cartridge cases. Specifically, this invention combines the necessary means to trim cartridge cases to a predetermined length while removing burrs and chambering both the inside and outside of the case mouth, remove cartridge case material used to crimp primers into the cartridge case by swaging, cutting the cartridge case primer pocket to a predetermined depth, chambering both the inside and outside surface of the cartridge case flash hole, and trimming the wall thickness of the cartridge case neck to a uniform dimension, all with the same device and by a manner that increases convenience and accuracy over any other means currently available.

Description of Prior Art

Numerous machines have been invented to perform the necessary steps to recondition and reuse fired cartridge cases. During the physical act of firing a modern firearm using metallic cartridge cases, the case expands slightly due to the high pressure contained inside the cartridge case. The case is contained on all but one surface by the firearm's chamber so that the projectile is forced to leave the cartridge case and travel through the barrel to the muzzle and towards its intended target by the intense pressure released or generated by the propellant. Once the firing process has concluded, the now empty cartridge case may be removed from the firearm and either discarded or reused.

It is standard accepted practice to resize or swage the cartridge case into a metallic die to reform the case to its proper dimensions, which were distorted by the high pressures generated during the previous firing. When the cartridge case is resized, the diameters of the case are reduced slightly so the case may then be reinserted into a firearm's chamber without interference. Without resizing, the cartridge case may not enter a chamber and function as intended. While the resizing process reduces the diameters of the case along its main axis, the material displaced lengths the cartridge case along the major axis of the case. Typical values of overall length increase range from 0.002" to 0.015" per firing and resizing sequence. When using the existing known art to resize a cartridge case, the additional length appears at the mouth of cartridge case. It is then necessary to remove the excess material before reusing the case.

To remove this excess material from the cartridge case mouth, some type of mechanical process is used to cut the material off of the cartridge case while leaving the head of the case undisturbed. Typical devices currently used include the use of a rotating cutter(s) acting on a fixed case held by the case head, rotating cutter(s) acting on a fixed case held by some type of gage or die, rotating cutter(s) acting on a case inserted into some type of fixed gage or die, or files used to remove the case material exposed above a gage surface. These devices all leave the cartridge case mouth in full contact with the cutting device until manually removed. Most of these current devices also leave burrs along the freshly cut surface of the case mouth, which must be removed to safely reuse the cartridge case. If the burrs are not removed from both the inside surface and outside surface of the case neck before a projectile is inserted in the cartridge case, then into a firearm's chamber, excessive force may be applied to the projectile by the chamber walls acting like a clamp or collet holding device restricting its ability to leave the cartridge case and cause increased pressures inside the firearm chamber.

While many devices exist to trim the excess material from a resized metallic cartridge case, none are known to index the cartridge case to the cutting surfaces and remove the case from the cutting surface automatically or prevent the case from contacting the cutting surface without some action, namely physically moving the cutter and case away from each other.

Accordingly it is an object of this invention to trim the mouth of resized cartridge cases to the desired overall length by indexing the case off some known repeatable point of the case other than the case head, chamber the case mouth edges on both the inside and outside and outside surfaces, and automatically withdraw the case from the cutting blade when additional manual force is not applied. The cutting of material from the case neck stops when the cartridge case has engaged the case holder assembly and the moving portion of the case holder assembly reaches a mechanical stop. Withdrawing the case from the cutting surface occurs when the manual pressure applied to the case during the trimming process is removed. A spring device lifts the cartridge case away from the cutting surface until the user applies some pressure to the case to force the case towards the cutting surface, and away from the cutting surface once the user added pressure is removed.

To reuse cartridge cases that have had the primer swaged or staked in place, it is necessary to first remove the used primer and recondition the primer pocket to remove the material displaced by the swaging process. Without removing this material, a new cartridge primer cannot be inserted properly because the exposed edge of the primer pocket is dimensionally smaller than the remaining depth of the pocket and the outside diameter of a new primer. Existing devices used for this process are typically one of two types, those cutting material from the case, and those that swage the material back away from the cartridge case primer pocket using a mechanical force. With either device it is desirable, for more accurate ammunition, to make the finished primer pocket as uniform in dimension as possible and with a flat bottom in the primer pocket perpendicular to the cartridge case main axis. By using a mechanical cutting device to remove the displaced material away from the primer pocket and cut the bottom of the primer pocket flat, the overall dimensional accuracy of the finished primer pocket is higher than with a swaging type device. The overall dimensional uniformity from case to case in a given lot of cartridges will greatly influence the accuracy potential of the cartridges when fired. Ammunition prepared with cartridge cases using uniformed primer pockets will be generally yield a smaller dispersion around an aiming point, a very desirable feature for users trying to achieve the utmost in accuracy.

Other devices exist for removing the excess material and cutting the bottom surface of the primer pocket, but typically are two step devices. One step is to remove the excess material, and another to cut the flat surface of the pocket. One other device is known to exist the combines these two steps into one process. While there are several known tools to remove the excess material and uniform the bottom of the primer pocket, none are known to be combined with a cartridge case trimmer that automatically removes the case from the cutting surface.

To facilitate more uniform ignition of propellant inside a cartridge case typically yields a more accurate cartridge. Accordingly, it is common practice to remove any burrs present around the opening inside a cartridge case between the primer pocket and the inside of the cartridge. This passage is typically known as the flash hole. If burrs are present on either side of the flash hole, the flame released from the primer upon detonation may not enter the cartridge case main body to ignite the propellant in an even manner. Propellant ignited from an even axially centered flash produces more uniform ignition and combustion than that ignited by a flash entering the cartridge case main body in some random orientation. As is seen with uniforming primer pockets, ammunition prepared with cartridge cases having the flash hole surfaces deburred will typically yield a smaller dispersion than those without the benefit of the deburring process. Typically known devices for deburring the flash hole of cartridge cases use a small metal cutting bit to chamber the edge of the flash hole from both the inside and outside of the case. This will remove any burrs remaining from the punching process typically used in the manufacture of cartridge cases.

There are several known varieties of tools used to deburr the flash hole of a cartridge case, but none are known to be combined with the previously mentioned devices that can automatically remove the cartridge case from the cutting action.

Metallic cartridge cases are typically manufactured by a deep drawing process to extrude the basic shape and form of the cartridge case from a strip of brass alloy material. During the initial forming and subsequent resizing for reuse, the wall of the cartridge case neck can become uneven or non-uniform in thickness. Cartridge cases with a case neck of uneven thickness can affect the case's ability to release the projectile during the firing process. By removing the additional material around the case neck and making the case neck wall thickness more uniform, the initial movement of the projectile out of the cartridge case is more properly aligned with the bore of the barrel. By aligning the projectile closer to the true axis of the barrel, the projectile's path down the barrel and to its intended target is straighter and more accurate. Existing devices to remove this excess material all use some type of cutting blade aligned perpendicular to the axis of the cartridge case and support the case neck by use of a mandrel inside the case neck. The purpose of the mandrel is to ensure the case neck wall thickness is uniform and aligned with the axis of the case. If the excess material in the cartridge case neck is removed without supporting the case neck very close to the cutting action, the case neck will deflect away from the pressure of the cutting tool and an uneven surface will result. Known devices exist that use an automated feature of the device to move the cutter across the surface of the case neck parallel to the axis of the cartridge case and others use hand pressure to move the cutting across the surface. This procedure can be accomplished by rotating the cartridge case around a fixed cutting blade and mandrel assembly or by the cutting blade and mandrel rotating around a fixed cartridge case held in place.

While there are several known varieties of devices to accomplish trueing, turning, or shaving the cartridge case neck, none are known to combine this with trimming the overall length of the case, removing the staked or swaged material from a primer pocket, uniforming the primer pocket size, shape, and depth, and deburring the flash hole of a cartridge case into one device or with the ability to withdraw the case from the cutting surfaces automatically.

Accordingly, it is an object of the present invention to trim the overall length of a cartridge case and remove burrs on both the inside surface and outside surface of the case mouth at the same time, remove excess material from the cartridge case primer pocket, uniform the cartridge case primer pocket size, shape, and depth, deburr the flash hole of a cartridge case, and true, turn or shave the cartridge case neck with one device by the using interchangeable accessories on a single device. Another object of the present invention is to withdraw the case from the cutting surfaces of each operation by using a case holding device that will move the case when the manual pressure used to hold the cartridge case in the cartridge case holder assembly is removed.

SUMMARY OF THE INVENTION

In one embodiment of the invention, a base is constructed to hold and position body housing bearings, a rotating shaft, cartridge case positioning device, a power source, and control device. This base will allow the orientation of the devices mounted to the base to changed easily from horizontal to vertical without any additional parts or necessary modifications. The bearings in the body housing support the rotating shaft aligned axially with a removable cartridge case position device. A power source, positioned also on the base, drives the rotating shaft. The rotating shaft has provisions to mount interchangeable sections on the end opposite the driving device. Each different interchangeable section may be attached to the end of the rotating shaft and are designed to perform a one or more of the functions described above. The removable cartridge case holder has an internal profile closely matching the specific caliber of cartridge desired and the portion of the cartridge case to be inserted, and is constructed in such a manner as to lift the cartridge case away from any device attached to the rotating shaft when not acted upon by some force. Some interchangeable cartridge case holders are intended to position a case with the neck of the case presented to the rotating shaft, others are intended to position a case with the head presented to the rotating shaft.

When trimming a cartridge case using the invention, a case is inserted into the case holder by hand while the power source drives the rotating shaft. The rotating shaft is equipped with the case trimming interchangeable section holding a cutting blade that has surfaces positioned to remove material from the overall length of the case, as well as remove burrs or chamber both the inside and outside surfaces of the case mouth. The case holder is designed to allow the cartridge case to be inserted into the inner portion until some surface of the case contacts a mating surface inside the inner portion of the case holder and the case neck projects beyond the surface of the case holder. Once the case is in contact with the inner portion of the case holder, the inner portion and case move together towards the cutting blade and against a spring contained in the space between the inner and outer portions of the case holder assembly. A final mechanical stop is formed between the inner and outer portions of the case holder assembly. Once these two surfaces meet, the cartridge case cannot move toward the cutting blade any further. As the case mouth contacts the rotating cutting blade, excess material is removed and the edges of the case mouth are chambered. Once the rotating blade has removed the material desired, the cases is then released and the captive spring will life the case and inner portion of the case holder away from the rotating cutting blade. If the unit is positioned with the rotating shaft in a vertical orientation, any debris created by the removal of the excess material will fall away from the case holder and case, falling into the chamber created by the body and cover around the cutting blade. If the device is positioned with the rotating shaft in a horizontal position, any debris from the cutting action can fall into the inner portion of the case holder assembly when the case is removed from the device. If the debris is not removed before the next case is inserted into the case holder assembly, it is possible to falsely index the case to the cutting surfaces by resting on the debris and not the intended inner surface of the case holder.

When using the invention to remove the material swaged into the primer pocket, a case is inserted into the case holder by hand while the power source drives the rotating shaft. The rotating shaft is equipped with the primer pocket deswaging interchangeable section holding a cutting blade that has surfaces positioned to remove material from the edge of the cartridge primer pocket. The case holder is designed to allow the cartridge case to be inserted into the inner portion until some surface of the case contacts a mating surface inside the inner portion of the case holder and positioning the head of the case towards the cutting blade. Once the case is in contact with the inner portion of the case holder, the inner portion and case move together towards the cutting blade and against a spring contained in the space between the inner and outer portions of the case holder assembly. As the primer pocket edges of the case contact the rotating cutting blade, excess material is removed and the edges of the primer pocket are chamfered. Once the rotating blade has removed the material desired, the case is the released and the captive spring will lift the case and inner portion of the case holder away from the rotating cutting blade. If the unit is positioned with the rotating shaft in a vertical orientation, any debris created by the removal of the excess material will fall away from the case holder and case, falling into the chamber created by the body and cover around the cutting blade.

When using the invention to cut the primer pockets of several cases to a uniform set of dimensions, a case is inserted into the case holder by hand while the power source drives the rotating shaft. The rotating shaft is equipped with the primer pocket uniforming interchangeable section holding a cutting blade that has surfaces positioned to remove material from the sides and bottom of the cartridge case primer pocket. The case holder is designed to allow the cartridge case to be inserted into the inner portion until some surface of the case contacts a mating surface inside the inner portion of the case holder and positioning the head of the case towards the cutting blade. Once the case is in contact with the inner portion of the case holder, the inner portion and case move together towards the cutting blade and against a spring contained in the space between the inner and outer portions of the case holder assembly. As the primer pocket surfaces contact the rotating cutting blade, excess material is removed and the primer pocket is uniformed. Once the rotating blade has removed the material desired, the case is the released and the captive spring will life the case and inner portion of the case holder away from the rotating cutting blade. If the unit is positioned with the rotating shaft in a vertical orientation, any debris created by the removal of the excess material will fall away from the case holder and case, falling into the chamber created by the body and cover around the cutting blade.

When using the invention to remove any burrs and chamber the edges of a cartridge case flash hole, a case is inserted into the cases holder by hand while the power source drives the rotating shaft. The rotating shaft is equipped with the flash hole deburring interchangeable section holding a cutting blade that has surfaces positioned to remove material from the edge of the cartridge case flash hole. The case holder is designed to allow the cartridge case to be inserted into the inner portion until some surface of the case contacts a mating surface inside the inner portion of the case holder and the case neck projecting beyond the surface of the case holder. Once the case is in contact with the inner portion of the case holder, the inner portion and case move together towards the cutting blade and against a spring contained in the space between the inner and outer portions of the case holder assembly. As the edges of the flash hole contact the rotating cutting blade, excess material is removed and the edges of the edges of the flash hole are chamfered. Once the rotating blade has removed the material desired, the case is the released and the captive spring will lift the case and inner portion of the case holder away from the rotating cutting blade. If the unit is positioned with the rotating shaft in a vertical orientation, any debris created by the removal of the excess material will fall away from the case holder and case, falling into the chamber created by the body and cover around the cutting blade.

When using the invention to true, turn or shave excess material from a cartridge case neck wall, a case is inserted into the case holder by hand while the power source drives the rotating shaft. The rotating shaft is equipped with the case neck turner interchangeable section holding a cutting blade that has surfaces positioned to remove material from the outer surface of the cartridge case neck while supporting the case neck with a mandrel inside the case neck. The case holder is designed to allow the cartridge case to be inserted into the inner portion until some surface of the case contacts a mating surface inside the inner portion of the case holder and the case neck projecting beyond the surface of the case holder. Once the case is in contact with the inner portion of the case holder, the inner portion and case move together towards the cutting blade and against a spring contained in the space between the inner and outer portions of the case holder assembly. As the outer surface of the case neck contact the rotating cutting blade, excess material is removed and the case neck wall thickness is turned to uniform thickness. Once the rotating blade has removed the material desired, the case is the released and the captive spring will lift the case and inner portion of the case holder away from the rotating cutting blade. If the unit is positioned with the rotating shaft in a vertical orientation, any debris created by the removal of the excess material will fall away from the case holder and case, falling into the chamber created by the body and cover around the cutting blade.

This invention has alternate embodiments with a rotating shaft configured to only trim cartridge cases or deswage primer pockets or uniform primer pockets or deburr primer pocket flash holes or neck turn cartridge case necks and not perform the other functions listed above by using a rotating shaft without the interchangeable sections, i.e. dedicated function devices rather than a multiple function device, but still automatically withdraw the case from the cutting surface when manual pressure is not applied. Another alternate embodiment of the invention uses a variable speed power source. This will allow the user to set the speed of the rotating shaft and attached cutting surfaces of the speed best suited for the operation performed.

These and other features of the present invention will be apparent to those of skill in the art from a review of the following detailed description along with the accompanying drawings.

BRIEF DESCRIPTION OF THE DRAWINGS

FIG. 6 shows assembled and disassembled perspective views a detailing only the interchangeable section of the rotating shaft and its components, for use in trimming the length of cartridge cases.

FIG. 7 depicts assembled and disassembled perspective views detailing only the interchangeable section of the rotating shaft and its components, for use in removing the swaged portion of a cartridge case primer pocket.

FIG. 9 represents assembled and disassembled perspective views detailing only an interchangeable section and its components, for use in uniforming the size and depth of a cartridge case primer pocket.

FIG. 11 shows assembled and disassembled perspective views detailing only an interchangeable section and its components, for use in tuning the external surfaces of a cartridge case neck.

DETAILED DESCRIPTION OF A PREFERRED EMBODIMENT

Figure 1:
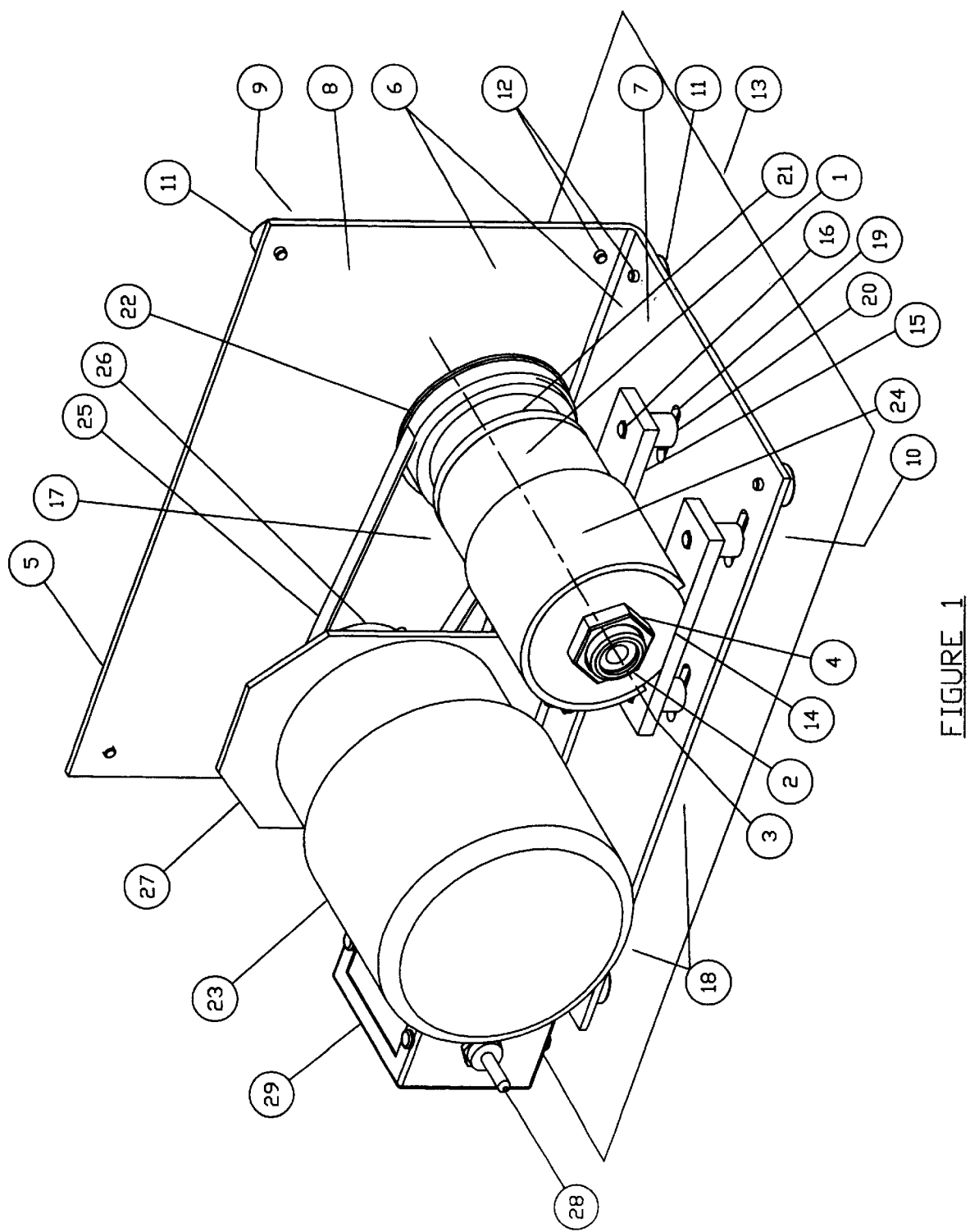
FIG. 1 is an assembled perspective view of the present invention configured as a cartridge case trimmer.

In FIG. 1, an assembled perspective view of the present invention configured as a cartridge case trimmer, the cartridge case preparation device assembly 18 is shown configured as a case trimmer unit 17. A cylindrical-shaped body 1, of the case trimmer unit 17, is of cast or machined metal, such as aluminum or zinc alloy. The cylindrical-shaped body 1 is configured to accept a cartridge case holder assembly 2 aligned through a center axis 3 of the body 1. The cartridge case holder assembly 2 is mounted into the body 1 using mating threaded surfaces (not shown in this figure, but further described in FIG. 4). In one preferred embodiment, a thin hex nut 4 is used to jam the mating threaded surfaces (not shown) and prevent rotation of the cartridge case holder assembly 2. Alternate embodiments may use any known locking means for threaded components that is not permanent and can be loosened for future adjustment.

Also in FIG. 1, a base 5, typically of rigid steel, the base 5 has two main planes 6 being 90 degrees apart from each other. These main planes 6 allow the use of the cartridge case preparation device in either horizontal or vertical orientation without modification, damage, or inconvenience, simply by tilting the entire device from one major plane resting on the work surface to the other major plane resting on the same work surface. In the horizontal position, the surface of base 5 that the body 1 attaches to, a horizontal plane 7, is parallel with a work surface, bench, table top, or other suitable place. In the vertical position, the surface of base 5 that the body 1 attaches to, a vertical plane 8, is perpendicular with a work surface, bench, table top, or other suitable place.

Also in FIG. 1, the exterior surfaces 9, 10 of the two main planes 6, being the horizontal plane 7 and the vertical plane 8, respectively, of the base 5, are equipped with rubber footing bumpers 11 secured by threaded fasteners 12. These bumpers 11 provide vibration isolation to the cartridge case preparation device against a work surface 13, help to keep the device in place by increasing sliding friction between the device and the work surface 13, and prevent the device from marring most work surfaces. The rubber footing bumpers 11 may be any convenient size or shape attached to the exterior surfaces 9, 10 by any known means. Alternative materials that possess similar physical properties may be substituted such that the same benefits result.

Returning to the cylindrical-shaped body 1 of the case trimmer unit 17, body 1 has a flat surface face 14, machined and formed into the otherwise cylindrical-shaped body 1. Mounting feet 15, being of bar stock material, the mounting feed 15 provide for attaching the flat surface face 14 to the body 1 by means of threaded fasteners (not shown). Threaded holes 16 in the ends of the mounting feed 15 are provided to attach the assembled body 1 and mounting feet 15 to the base 5 of the entire cartridge case preparation device assembly 18. Threaded fasteners (not shown) with washers (not shown) project through slotted holes 19 in base 5 and through spacers 20 before contacting the threaded holes 16 and clamping the body 1 to the base 5. A bearing retainer cap 21, being a machined cap used to secure sealed bearings (not shown) into a bearing pocket (not shown), is fixedly attached to the cylindrical-shaped body 1. A driven pulley 22 is used to transmit power from an electric drive motor 23 to a main body shaft portion (not shown) of the cylindrical-shaped body 1. The driven pulley 22 is pressed onto a shaft end (not shown) of the cylindrical-shaped body 1. The driven pulley 22 may typically be of a Delrin™ material, "XL", ⅕" pitch cogged timing belt pulley. A cylindrical guard 24 is of clear acrylic™ or lexan™ shield over a bowl-shaped relief (not shown) cut into the cylindrical-shaped body 1. The cylindrical guard 24 prevents debris created by the various processes from escaping outside the bowl-shaped relief, allows visual inspection of a process without exposing an operator to hazardous flying particles.

The drive system (better seen in FIG. 2, ref. element 31) for the cartridge case preparation device 18 comprising an electric drive motor 23 mounted to the base 5 and coupled to a rotating shaft assembly (not shown) by a drive belt 25, typically of rubber, and pulley 26. Alternate drive systems may use any other known type of motor, such as hydraulic or pneumatic motors. Alternate drive systems may use any known means of transmitting power between a driving rotating shaft and a driven rotating shaft, such as spur gears, sprockets and chain belt, pulleys and V or flat belts, a connecting rod, flexible coupler, or rotating bellows. A mounting bracket 27 secures the electric drive motor 23 to the base 5 with threaded fastener assemblies (not shown). Alternate mounting provisions for the drive motor 23 may be any known type suitable to the chosen motor's requirements. A means of supplying the drive motor 23 with energy safely is provided by a power switch 28 contained in a terminal box 29 mounted to base 5. The specific power ratings for the power switch 28 shall meet or exceed the power requirements of the drive motor 23 so that the users may turn the cartridge case preparation device 18 on or off after the device is connected to a proper power supply, without fear of damage to the device, or hazard to the user. Alternate embodiments of the cartridge case preparation device may use a variable speed control device to allow the user to regulate the speed of the rotating shaft, with the desired function. This control may be any of the known means to control electric, hydraulic, or pneumatic motors.

Figure 2:
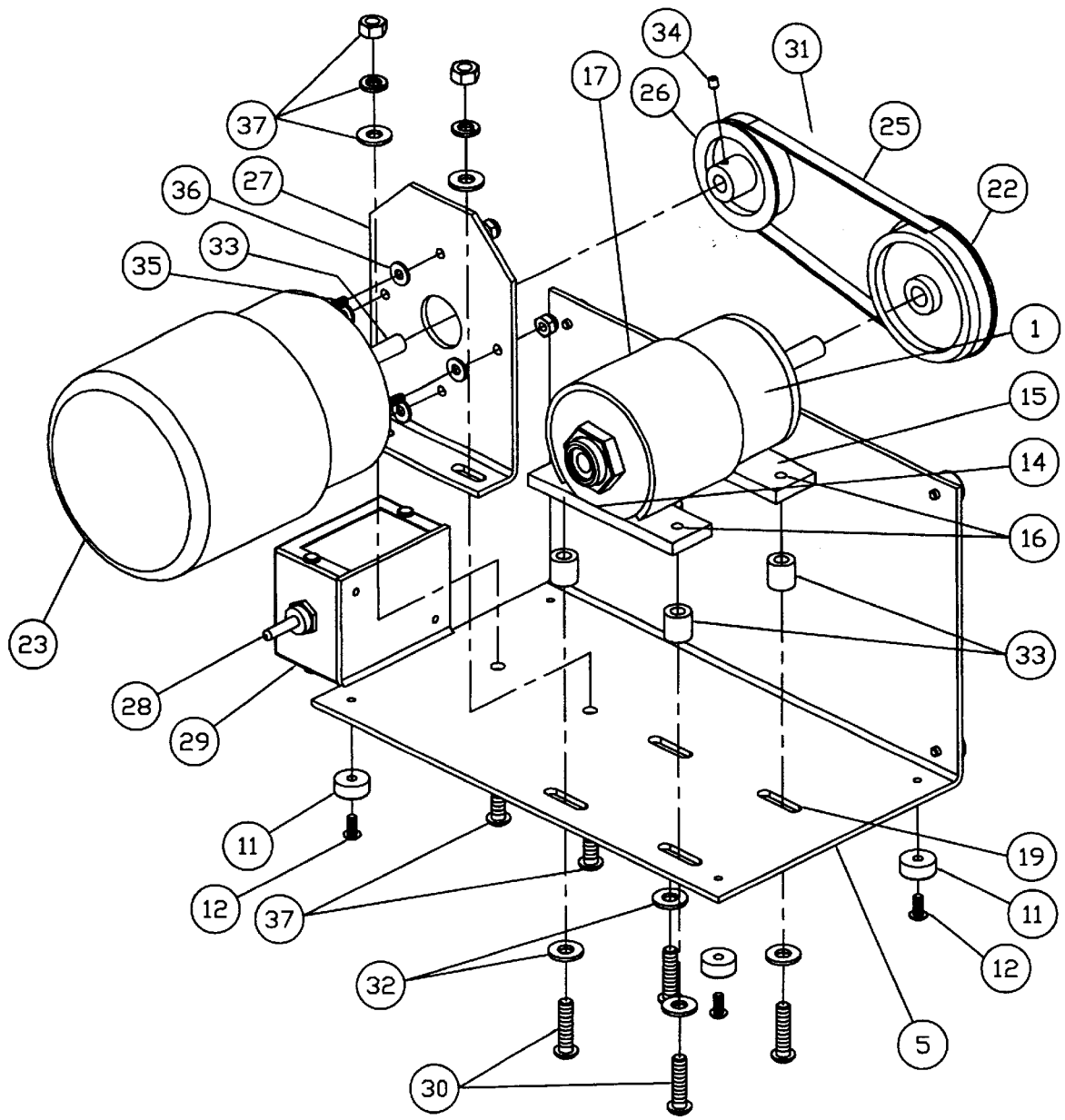
FIG. 2 is a disassembled perspective view of the present invention configured as a cartridge case trimmer.

As seen in FIG. 2, a disassembled perspective view of the present invention configured as a cartridge case trimmer, the cylindrical-shaped body 1 of the case trimmer unit 17 is mounted to a plurality of mounting feet 15 of bar stock material, via the flat surface face 14 of body 1, by means of threaded fasteners 30 using slotted holes 19 in base 5, the slotted holes 19 allowing the entire case trimmer unit 17 to move to adjust the drive system 31 or easily replace the weakest component of the drive system 31, being the rubber drive belt 25. Alternative embodiments of the body 1 may incorporate the threaded holes 16 directly into the flat surface face 14 or incorporate the mounting feet 15 by casting the body 1 with the mounting feet 15 integral to the body 1. The threaded fasteners 30 are typically ¼–20 UNC button head machine screws, and flat washers 32, typically ¼" thick, are used to give the threaded fasteners 30 adequate torque surface along the slotted holes 19 in the base 5. In one embodiment, the slotted holes 19 are four oblong slots in the base 5 used to secure the body 1, and still allow limited range of motion for assembly and initial adjustment of the drive system 31. Between the plurality of slotted holes 19 in the base 5 and their respective mounting feet 15 are interspersed a plurality of spacers 33, being hollow metal cylinders used to raise the mounting feet 15 off the surface of the base 5, to allow the pulley 22 to clear the base 5. The pulley 22 being larger in diameter than the cylindrical-shaped body 1. The base 5 is equipped with rubber footing bumpers 11 secured by threaded fasteners 12.

Also shown in FIG. 2, is the electric drive motor 23 mounted to the base 5 and coupled to a rotating shaft 33 by a drive belt 25 and pulley 26, the coupling secured by a set screw 34. The coupling of the rotating shaft 33 and pulley 26 is stabilized by a between-lying mounting bracket 27. Threaded extensions 35 of the electric device motor 23 are secured to the mounting bracket 27 with a threaded fastener assembly 36, comprising a set of hex nuts and nylon locking hex nuts located on either side of the mounting bracket 27. The mounting bracket 27 is further secured to the base 5 with a further type of threaded fastener assembly 37 comprising a set of button head machine screws, washers, lock washers, and hex nuts. A means of supplying the electric drive motor 23 with energy safely is provided by a power switch 28 contained in a terminal box 29 mounted to base 5.

Figure 3:
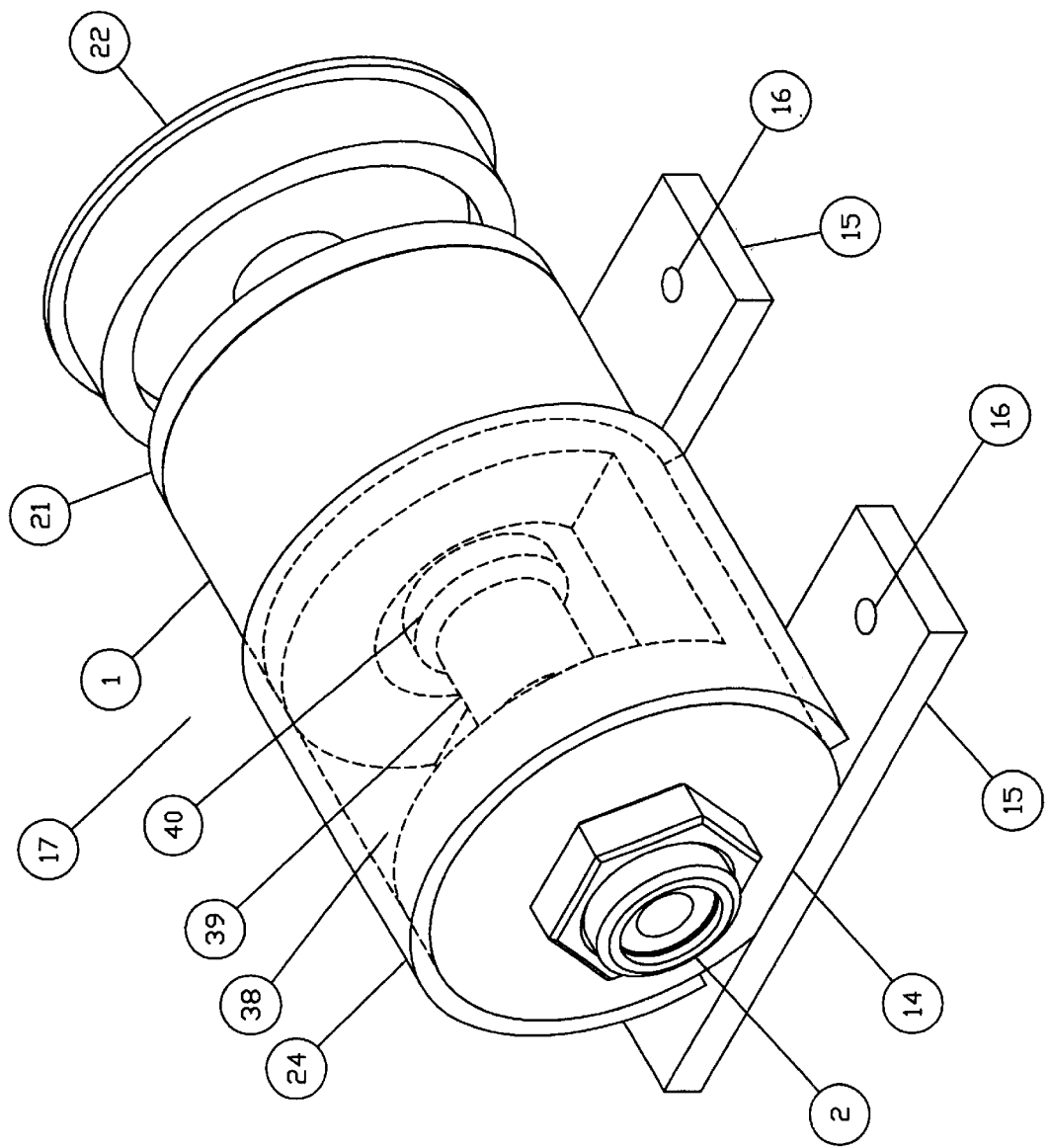
FIG. 3 is an assembled perspective view detailing only the body portion of the present invention configured as a cartridge case trimmer.

In FIG. 3, an assembled perspective view detailing only the body portion of the present invention configured as a cartridge case trimmer, the cylindrical-shaped body 1 of the case trimmer unit 17, body 1 has a flat surface face 14, machined and formed into the otherwise cylindrical-shaped body 1. Mounting feet 15, being of bar stock material, the mounting feet 15 provide for attaching the flat surface face 14 to the body 1 by means of threaded fasteners (not shown). Threaded holes 16 in the ends of the mounting feet 15 are provided to attach the assembled body 1 and mounting feet 15 to the base (not shown in this figure) of the entire cartridge case preparation device assembly (not shown in this figure). A bearing retainer cap 21, being a machined cap used to secure sealed bearings (not shown) into a bearing pocket (not shown), is fixedly attached to the cylindrical-shaped body 1. A driven pulley 22 is used to transmit power from an electric drive motor (not shown in this figure) to a main body shaft portion (not shown) of the cylindrical-shaped body 1. The driven pulley 22 is pressed onto a shaft end (not shown) of the cylindrical-shaped body 1. The driven pulley 22 may typically be of a delrin™ material, "XL", ⅕" pitch cogged timing belt pulley. A cylindrical guard 24 is of clear acrylic™ or lexan™ shield over a bowl-shaped relief 38 cut into the cylindrical-shaped body 1.

The cylindrical guard 24 prevents debris created by the various processes from escaping outside the bowl-shaped relief 38, allows visual inspection of a process without exposing an operator to hazardous flying particles.

By using the device in the horizontal orientation, greater convenience is facilitated by visually presenting the cartridge case holder assembly 2 and the case trimmer interchangeable section 39 to the user for easier adjustment. The cartridge case holder assembly 2 interconnects to a rotating shaft assembly (not shown in this figure), which in turn receives the case trimmer interchangeable section 39 which is threadably attached to a main body shaft 40. The case trimmer interchangeable section 39 being a portion of a rotating shaft designed to be interchangeable and dedicated to a single function—trimming the overall length of a firearm case (not shown). The main body shaft 40 is the main drive shaft of the device and has a threaded recess (not shown) in an end surface, for mounting interchangeable sections used to perform different functions. In the vertical orientation, greater convenience is facilitated by allowing debris generated by the trimming process to fall away from the case trimmer cutting blade (not shown in this figure) and into the bowl-shaped relief portion 38 of the cylindrical-shaped body 1.

As also depicted in FIG. 3, the mating cylindrical guard 24 is held in place over the exterior surface of cylindrical-shaped body 1 by friction, and the cylindrical guard 24 covers the relieved portion 38 of body 1 to contain all debris generated by the trimming operation. The preferred embodiment uses a clear lexan™ or acrylic™ material for guard 24, but alternate embodiments may use other suitable materials. To open the cylindrical guard 24 and empty or clean the relieved portion 38 of the body 1, force may be applied to move the guard 24 axially down the exterior surface of the body 1 towards the pulley 22. The length of body 1 shall be sufficient to allow the movement of the cylindrical guard 24 to remain firmly attached to the exterior surface of body 1, fully exposing the relieved portion 38 of body 1 and not requiring complete removal of the cylinder guard 24 from the body 1, to clean, maintain or adjust the cartridge case trimmer unit 17. Friction shall be sufficient to prevent the cylindrical guard 24 from moving on the exterior surface of body 1 while the unit is operating in either the horizontal or vertical plane.

Figure 4:
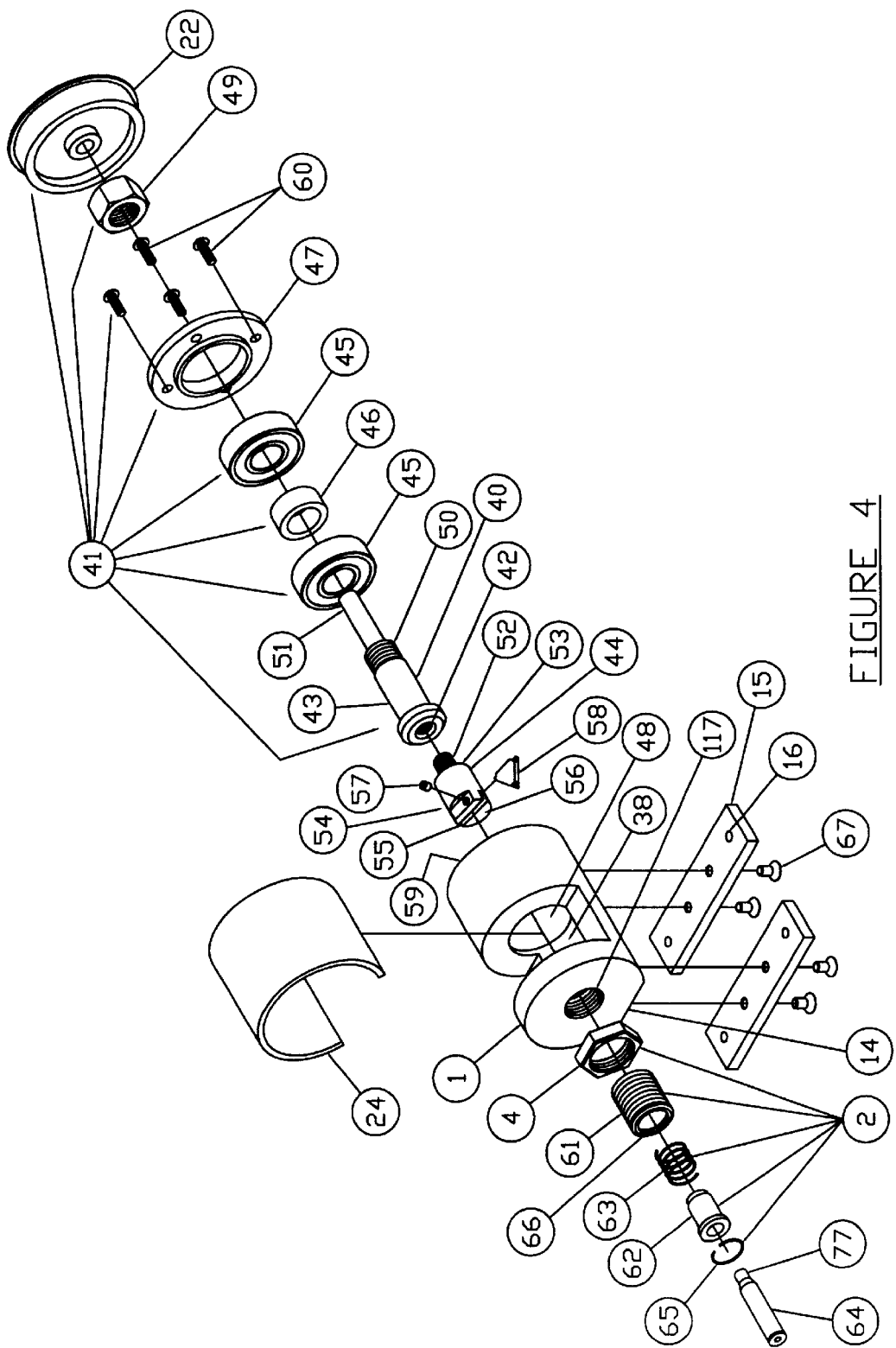
FIG. 4 is a disassembled perspective view detailing only the body portion of the present invention configured as a cartridge case trimmer.

In FIG. 4, a disassembled perspective view detailing only the body portion of the present invention configured as a cartridge case trimmer. A rotating shaft assembly 41 comprises the main body shaft 40 having a threaded recess 42 cut into a first end 43 of the main body shaft 40, the threaded recess 42 accepting an interchangeable body section 44, being one of various interchangeable sections used to perform different functions. The main body shaft 40 accepting a plurality of sealed bearings 45 separated by spacers 46, the sealed bearings 45 secured by a bearing retainer cap 47 being a machined cap used to secure the sealed bearings 45 into a bearing pocket 48, a relief counterbore inside the cylindrical-shaped body 1. A locking hex nut 49 mates with an external threaded portion 50 of a second end 51 of the main body shaft 40, and a pulley 22 is pressed onto the second end 50. In the present configuration, the interchangeable body section 44 being the case trimmer interchangeable section 39 of FIG. 3. Spacers 46 may be omitted based on the size of the sealed bearings 45 and the size of the bearing pocket 48.

At a first end 54 of the interchangeable body section 44 is located a groove 55 being a machined relief across a face 56 of the interchangeable body section 44. At a second end 53 of the interchangeable body section 44, projecting male threads 52 mate with the threaded recess 42 of the main body shaft 40. A set screw 57 holds captive a case trimmer cutting blade 58 into groove 55. Threaded surfaces allow the precise adjustment of the cartridge case holder assembly 2 in relationship to the distance to the case trimmer cutting blade 58 on the rotating shaft assembly 41. The rotating shaft assembly 41 is inserted into the bearing pocket 48 of the body 1 on the opposite face end 59 of the body 1 from that of the cartridge case holder assembly 2. The rotating shaft assembly 41 is held inside the bearing pocket 48 by a being register cap 47 held in place by fasteners 60. Alternative methods for securing the bearings into the body 1 may be any previously known method of securing bearings, such as internal snap rings, threaded fasteners, press fits, or adhesives. Returning to the cylindrical-shaped body 1, a flat surface face 14, is machined and formed into the otherwise cylindrical-shaped body 1. Mounting feet 15 being of bar stock material provide for attaching the flat surface face 14 to the body 1 by means of threaded fasteners 67. Threaded holes 16 in the ends of the mounting feet 15 are provided to attach the assembled body 1 and mounting feet 15 to a base (not shown in this figure) of the entire cartridge case preparation device assembly (not shown in this figure). The cylindrical-shaped body 1 has a bowl-shaped relief 38 cut into it; a cylindrical guard 24 of clear acrylic™ or lexan™ shield over the bowl-shaped relief 38.

The cartridge case holder assembly 2 is a multiple part assembly comprising an outer threaded body 61 accepting an inner support chamber 62 with a helical wound wire compression spring 63 used to bias the inner support chamber 62 against the outer threaded body 61 and keep a cartridge case 64 from contacting the case trimmer cutting blade 58 when not touched. An internal snap ring 65 being a single turn wire spring clip is used to secure the inner support chamber 62 inside the outer threaded body 61 as biased by spring 63, such securing being further aided by an annular groove 66, a square edged groove about the inside of the outer threaded body 61 where the internal snap ring 65 seats. A thin hex nut 4 is used to jam the mating threaded surfaces of the outer threaded body 61 and an internal threaded portion 117 of the cylindrical-shaped body 1 and prevent rotation of the cartridge case holder assembly 2. The cartridge case holder assembly 2 is designed to hold and present a cartridge case 64 to a cutting surface, case mouth 77 first.

If the cartridge case trimmer device were to be used horizontally for more than initial setup and adjustment, debris from the case trimming operation could enter the inner support chamber 62 and change the depth of engagement between the cartridge case 64 and the inner support chamber 62 and yield cartridge cases trimmed to an incorrect length, until such time as the debris is removed from the inner support chamber 62. Additionally, if the cartridge case trimmer device is used in a vertical orientation the force required to overcome the spring 63 in the cartridge case holder assembly 2 is applied in the downward direction and does not disturb the placement of the device on a work surface. No additional clamping or securing of the device is required to the work surface. In the vertical orientation, the cartridge case 64 must have additional manual force applied to overcome the spring 63 and also to automatically rise away from the case trimmer cutting blade 58 once the additional manual force is removed. This is to prevent the inadvertent contact of the cartridge case 64 mouth and the case trimmer cutter blade 58 without the case 64 being grasped or manipulated improperly and damaging the case by chattering against the case trimmer cutting blade 58. It is the preferred embodiment of this invention that the intended use of the device is in the vertical orientation.

Figure 5:
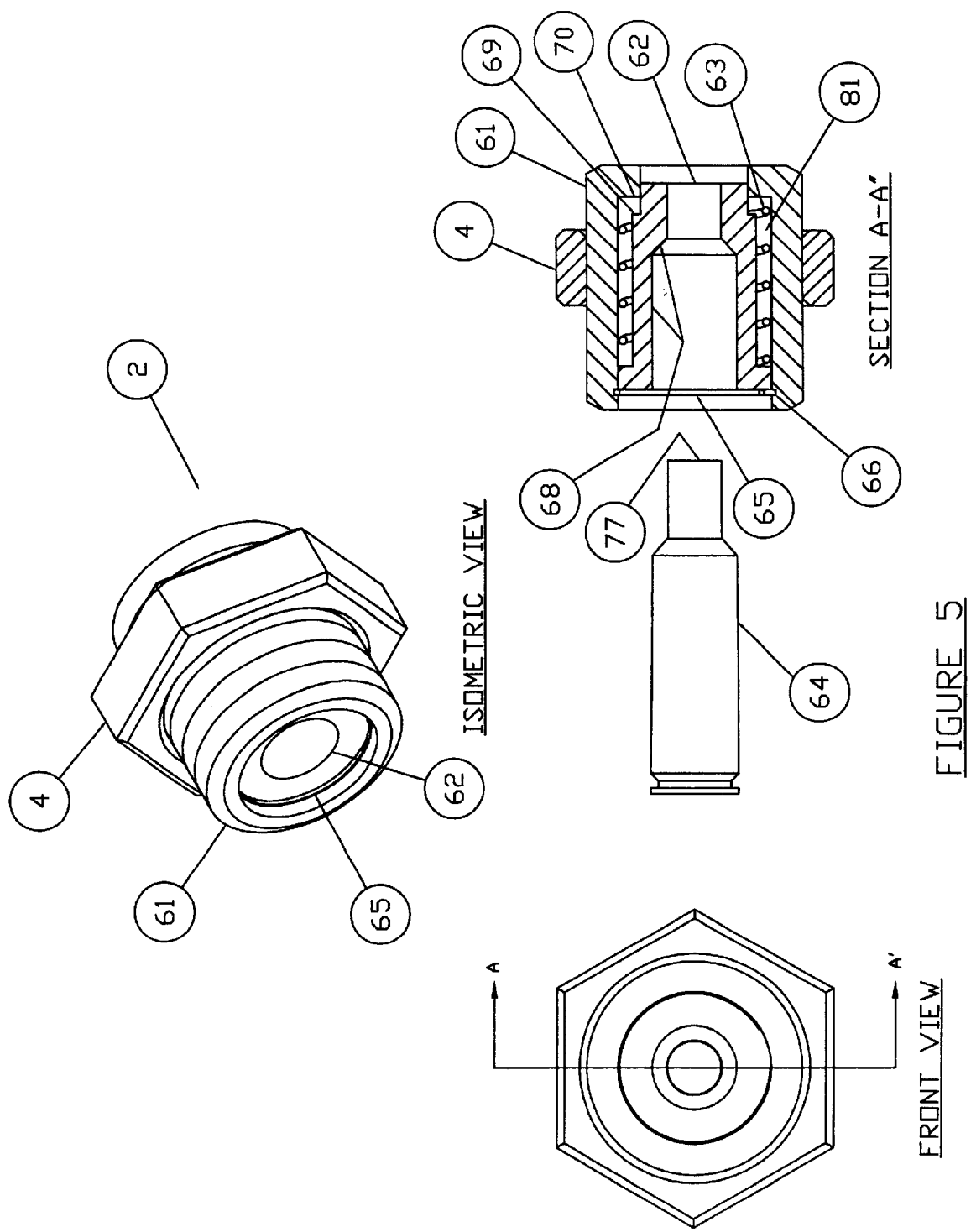
FIG. 5 is an assembled perspective section view of the cartridge case holder assembly showing the internal components configured to present the case mouth towards a cutting action.

FIG. 5 depicts an assembled perspective section view of the cartridge case holder assembly, in front, section A—A' and isometric views, showing the internal components configured to present the case mouth towards a cutting action. The cartridge case holder assembly 2 is shown in section through its major axis, and it comprises an outer threaded body 61 with a sprig biased moving inner support chamber 62. The inner support chamber 62 is internally contoured to closely match the external profile of a cartridge case 64. A spring 63 is held captive in the designed relief 81 between the outer threaded body 61 and the inner support chamber 62. An internal spring snap ring 65 is seated into an annular groove 66 cut into the inside surface of the outer threaded body 61 to contain the inner support chamber 62 against the spring 63 and inside the outer threaded body 61. When a cartridge case 64 is inserted into the cartridge case holder assembly 2, the case will enter into the inner support chamber 62 freely until some portion of the cartridge case 64 contacts a mating surface 68 inside the inner support chamber 62. Once the cartridge case 64 fully contacts the inner support chamber 62, pressure is applied to the case 64 to overcome the force of spring 63 and move the inner support chamber 62 until the annular step 69 meets the positive stop face 70 inside the bore of the outer threaded body 61.

Also in reference to FIG. 5, when a cartridge case 64 is to be trimmed, it is inserted into the cartridge case holder assembly 2 and reaches a mating surface 68 of the inner support chamber 62. At this point, the case mouth of the cartridge case 64 has not touched the cutting surfaces of the case trimmer cutting blade (not shown in this figure) (see FIG. 4). It is only after pressure is applied manually to overcome the force of spring 63 that the cartridge case mouth can come into contact with cutting surfaces of the case trimmer cutting blade (not shown in this figure) (see FIG. 4). Once the annular step 69 meets the positive stop face 70 inside the bore of the outer threaded body 61, the cartridge case 64 has moved towards the case trimmer cutting blade (not shown in this figure) as far as possible. The cartridge case 64 overall length may be measured and adjusted for additional cases by loosening the locking means, being in this embodiment the thin hex nut 4, for the cartridge case holder assembly 2, and moving the cartridge case 64 towards the case trimmer cutting blade (not shown in figure) to shorten the case, or away to lengthen the case. Once the overall length of the cartridge case has been measured and deemed acceptable, the cartridge case holder assembly 2 may be secured using the locking means, in this embodiment being the thin hex nut 4.

FIG. 6 shows assembled and disassembled perspective views detailing only the interchangeable section of the rotating shaft and its components, for use in trimming the length of cartridge cases. The case trimmer interchangeable section 39 comprises an interchangeable body section 44 with projecting male threads 52 for mounting the interchangeable body section 44 to the threaded recess 42 of the main body shaft 40, a groove 55 being a machined relief across a face 56 of the interchangeable body section 44 to accept a case trimmer cutting blade 58, and a threaded fastener 57 to hold the case trimmer cutting blade 58 in place. The case trimmer cutting blade 58 is typically of carbide, the case trimmer cutting blade 58 having three separate cutting surfaces, for cutting both inside and outside chambers at once, at 15 and 45 degrees, respectively.

The case trimmer interchangeable section 39 can be adjusted to chamfer both the inside and outside surfaces of the cartridge case neck (not shown) by movement of the case trimmer cutting blade 58 along the groove 55 until the proper balance of cutting action is found. Typical acceptable balance of the chamfered surfaces range from 50% inside surface vs. 50% outside surface to 90% inside surface vs. 10% outside surface. Each user will determine the acceptable balance based on personal perference.

In FIG. 7, an interchangeable body section configured to remove the staked or swaged portion of a primer pocket is shown in detail. A first end 74 of the pocket deswaging interchangeable body section 71 accepting and housing a tapered cutter blade 75; a threaded fastener 76 to secure the tapered cutter blade 75 in place. Two sizes of blade 75 are required to match the two common sizes of metallic cartridge case primers (not shown). The intended use and function of the two blades are identical, differing only in size. The tapered cutter blade 75 being a metal cutting bit used to remove material from a leading edge of a primer pocket recess (not shown) formed by staking or swaging primer in place. The method of attachment of a primer pocket deswaging interchangeable body section 71 to the rotating shaft 40 is the same as the method of attachment for the cartridge case trimmer interchangeable section 39. The pocket deswaging interchangeable body section 71 has projecting male threads 72 at a second end 73 of the interchangeable body section 71, the threads 72 to mate with the threaded recess 42 of the main body shaft 40.

Figure 8:
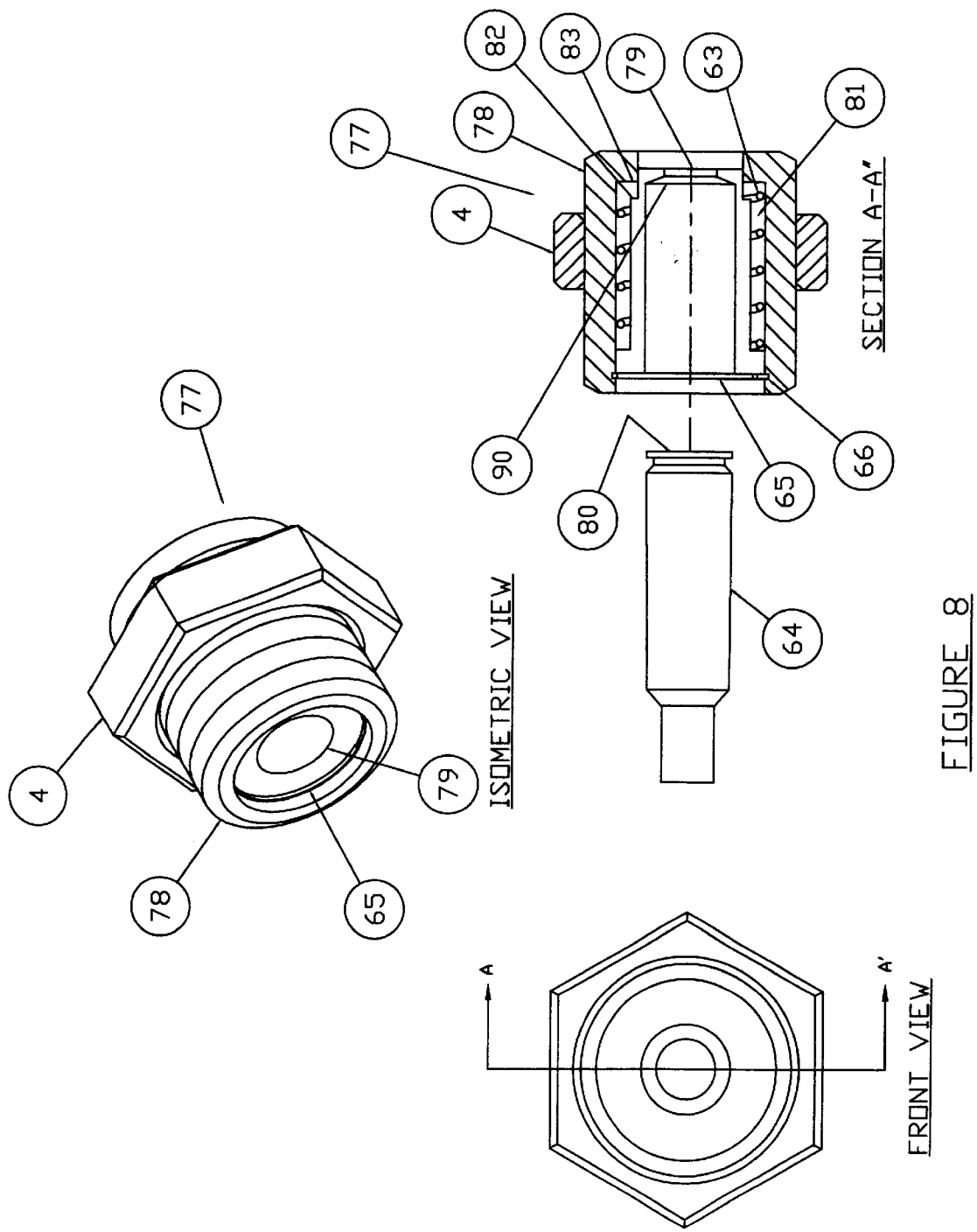
FIG. 8 is an assembled perspective section view of a cartridge case holder assembly showing the internal components configured to present the case head towards a cutting action.

FIG. 8 represents an assembled perspective section view of a cartridge case holder assembly in front, isometric, and section A—A' views, showing the internal components configured to present the case head towards a cutting action. A cartridge case holder assembly 77, here shown with a thin hex nut 4 in place, the cartridge case holder assembly 77 is shown sectioned through its major axis. The cartridge case holder assembly 77 comprises an outer threaded body 78 with a spring biased moving inner support chamber 79. The inner support chamber 79 differs from inner support chamber 62 (not shown in this figure; see FIG. 4) such that the cartridge case 64 may be inserted head 80 first towards a cutting blade (not shown in this figure). The cartridge case holder assembly 77 is internally contoured to closely match the largest diameter of a cartridge case 64. A spring 63 is held captive in the designed relief 81 between the outer threaded body 78 and the inner support chamber 79. An internal spring snap ring 65 is seated into an annular groove 66 cut into the inside surface 82 of the outer threaded body 78 to contain the inner support chamber 79 against the spring 63 and inside the outer threaded body 78. When cartridge case 64 is inserted into the cartridge case holder assembly 77, the case 64 will enter into the inner support chamber 79 freely until some portion of the cartridge case 64 contacts a mating surface inside the inner support chamber 79. Once the case 64 fully contacts the inner support chamber 79, pressure is applied to case 64 to overcome the force of spring 63 and move inner support chamber 79 until the annular step 82 meets the positive stop face 83 inside the bore of the outer threaded body 78.

At the point surfaces annular step 82 meets positive stop face 83, the cartridge case 64 has traveled as far toward the rotating cutting blade (not shown in this figure, ref. FIG. 7, element 75) as possible and the rotating cutting blade (not shown) removes the material interfering with the insertion of a fresh primer (not shown) into the cartridge case 64. When manual pressure is released, the inner support chamber 79, as acted upon by spring 63, lifts the cartridge case 64 up and away from the cutting blade (not shown). The contact surface 90 inside the inner support chamber 79 is angled to allow any debris generated by the cutting blade (not shown) to fall into the relief (not shown, ref. FIG. 3, element 38) of the cylindrical-shaped body (not shown, ref. FIG. 3, element 1), when the device is used in the vertical orientation.

FIG. 9 represents and disassembled perspective views detailing only an interchangeable section and its components, for use in uniforming the size and depth of a cartridge case primer pocket. An interchangeable body section 84 configured to uniform the depth and size portion of a primer pocket (not depicted) is shown in detail. A first end 87 of interchangeable body section 84 houses a straight walled cutter blade 88, and a threaded fastener 89 secures the cutter blade 88 in place into the interchangeable body section 84. Two sizes of blade 88 are required to match the two common sizes of metallic cartridge case primers (not shown). The two blades are identical in intended use and function, differing only in size; the straight walled cutter blade 88 being a metal cutting bit used to remove material from a bottom flat surface (not shown) of a primer pocket recess (not shown), uniforming the primer pocket (not shown). The method of attachment of the interchangeable body section 84 to the threaded recess 42 of the rotating shaft 40, is the same as for attaching the cartridge case trimmer interchangeable section 39 (ref. FIG. 6) to the rotating shaft 40. The interchangeable body section 84 has a second end 85 having projecting male threads 86 to mate with the threaded recess 42 of the rotating shaft 40.

The use of the straight walled cutter blade 88 (also referred to as a primer pocket uniforming blade) is identical to that of the primer pocket deswaging option described in FIG. 7, a combination of tapered cutter blade 75 and interchangeable body section 71, the two blades differing only in the surfaces from which excess material is removed. In both cases, the same cartridge case holder assembly (not shown, ref. FIG. 8, element 77) is used to position and guide the cartridge case (not shown).

Figure 10:
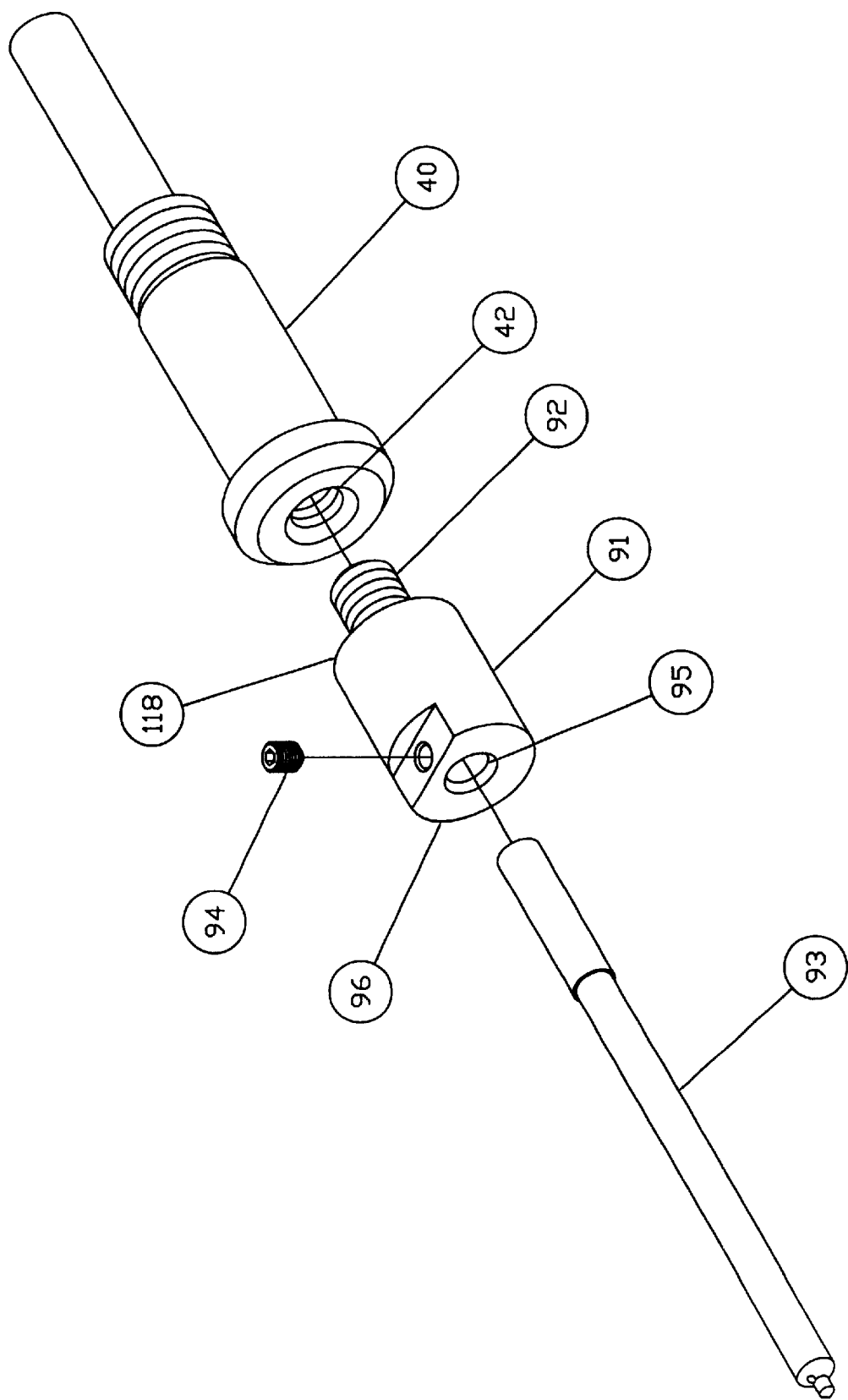
FIG. 10 is a disassembled perspective view detailing only an interchangeable section and its components, for use in deburring the internal and external surfaces of a cartridge case flash hole.

FIG. 10 shows a disassembled perspective view detailing only a flash hole deburring interchangeable body section and its components, for use in deburring the internal and external surfaces of a cartridge case flash hole; the interchangeable section configured to deburr the inside surface of the cartridge case flash hole is shown in detail. A step profiled cutting bit 93 is secured by a threaded fastener 94 into an accepting recess 95 in a first end 96 of an interchangeable body section 91. The method of attachment of the flash hole deburring interchangeable body section 91 to the rotating shaft 40 is the same as for the cartridge case trimmer interchangeable body section (not shown, ref. FIG. 6, element 39). The interchangeable body section 91 has threads 92 at a second end 118 of the interchangeable body section 91; the threads 92 mating with the threaded recess 42 of the rotating shaft 40.

When using the flash hole deburring interchangeable section 91, the cartridge case holder assembly (not shown in this figure; see FIG. 4, element 2) is used to support the case in the same manner previously descried for trimming the overall length of the cartridge case (not shown). The cutting bit 93 extends into the cartridge case neck (not shown) and deep into the case body (not shown) to contact the inside surface of the primer pocket flash hole (not shown). To regulate the depth of engagement between the step profiled cutting bit 93 and the cartridge (not shown in this figure), the cartridge case holder assembly (see FIG. 4, element 2) is adjusted in or outer, as required.

In FIG. 11, assembled and disassembled perspective views are shown, specifically front, section A—A', isometric, and exploded views, detailing only an interchangeable section and its components, for use in turning the external surfaces of a cartridge case neck. An interchangeable section configured to turn the cartridge case neck 121 is shown in detail. A first end 100 of the interchangeable body section 97 has a machined surface 101 with a recessed section 102; the recessed section 102 accepting a case neck pilot 103; a threaded fastener 104 used to secure the case neck pilot 103 to the interchangeable body section 97. The case neck pilot 103 being a cylindrical shaped guide and support for a cartridge case neck 121, the case neck pilot 103 used to prevent the forces of neck turning from deflecting the case neck wall 122 from a cutting bit 110. An extension piece 119 is fixedly attached at one end to the rim portion 111 of the machined surface 101 of the interchangeable body section 97, the extension piece 119 having a flattened anterior surface 105, a rounded posterior surface 106, a downward-directed hole 107 in a top surface 108, the hole 107 interconnecting with a rectangular slot 109 in the extension piece 119, the rectangular slot 109 extending between the anterior surface 105 and the posterior surface 106 of the extension piece 119, the rectangular slot 109 accepting a cutting bit 110 slidably attached to the rectangular slot 109. A threaded fastener 112 threadably attaching to a hole 116 formed in the posterior surface 106 of the extension piece 119, the threaded fastener 112 securing the cutting bit 110 in place, while allowing the cutting bit 110 to move in or out as needed. Threaded fastener 112 typically is a machine screw with a large knurled head 115, the threaded fastener 112 used to position the cutting bit 110 and move the cutting bit 110 in or out as required. A portion of the large knurled head 115 fits into a recess 120 in the cutting bit 110 to hold the cutting bit 110 captive against the head 115 of the fastener 112. The method of attachment of a cartridge case neck turning interchangeable body section 97 to the rotating shaft (not shown) is the same as previously described for the cartridge case trimmer interchangeable body section (not shown in this figure). The cartridge case neck turning interchangeable body section 97 has threads 98 at a second end 99 to mate with the rotating shaft (not shown).

When using the cartridge case neck turning interchangeable section 97, the cartridge case holder assembly (not shown, see FIG. 4, element 2) is used to support a cartridge case 64 in the same manner as the cartridge case holder assembly is used when trimming the overall length of a cartridge case 64. The case neck pilot 103 enters the case neck mouth 123 as the cartridge case 64 reaches its mating surface (not shown) (ref. FIG. 5, element 68) inside the inner support chamber (not shown) (ref. FIG. 5, element 62). As manual force is applied to a cartridge case (not shown), the case 64 moves downward until the exterior of the case neck 121 contacts the cutting bit 110 rotating about the major axis (Ref. FIG. 1, element 3) of the rotating shaft (not shown). As the case 64 is pushed down, the cutting bit 110 travels up the exterior surface of the case neck 121 removing any material in excess of the distance from the case neck pilot 103 to the tip 113 of the cutting bit 110. When the mating surfaces, being annular step 69 and positive stop face 70 (ref. FIG. 5) touch, the case 64 has moved towards the cutting bit 110 as far as possible. To regulate the depth of cutting action along the case neck 121, the cartridge case holder assembly 2 (ref. FIG. 4) is adjusted in or out as described for the other processes. To regulate the thickness of the cartridge case neck wall 122, the threaded fastener 112 is turned to move the cutting bit 110 closer or farther away from the neck pilot 103; the cutting bit 110 secured with a threaded fastener 114.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A cartridge case preparation device comprising:
    a base having two main planes being 90 degrees apart from each other, the main planes allowing the use of the device in either horizontal or vertical orientation;
    a derive system mounted to the base; and
    a cylindrical-shaped body mounted to the base, the body further comprising:
        a cartridge case holder assembly aligned through a center axis of the body;
        a rotating shaft assembly further comprising a main body shaft threadably attached to an interchangeable body section, the rotating shaft assembly having a first end accepting a plurality of sealed bearings, the rotating shaft assembly inserting at the first end into a bearing pocket of the body, the rotating shaft assembly coupled at a second end to the drive system; and
        a cylindrical guard fitting over and shielding a bowl-shaped relief cut into the body, the cylindrical guard slidably attached to the body.

2. The cartridge case preparation device of claim 1, wherein the cylindrical-shaped body having a flat surface face machined and formed into the otherwise cylindrical-shaped body; the flat surface face for facilitating the attaching of mounting feet secured between the cylindrical-shaped body and slotted holes in the base; the slotted holes for facilitating adjustments to the cartridge case preparation device.

3. The cartridge case preparation device of claim 1, wherein a bearing retainer cap is fixedly attached to the cylindrical-shaped body, the bearing retainer cap securing the plurality of sealed bearings to the rotating shaft assembly.

4. The cartridge case preparation device of claim 1, wherein bumpers are secured to the base; the bumpers providing vibration isolation, providing increased sliding friction between the device and a work surface to keep the device in place, and preventing the device from marring work surfaces.

5. The cartridge case preparation device of claim 1, wherein the device is used in the vertical orientation; a spring-loaded cartridge case holder assembly keeping a cartridge case from being pushed against a cutting surface by a gravity effect; trimming shavings falling downward without lodging in the case holder, preventing a false index point from occurring.

6. The cartridge case preparation device of claim 1, wherein the drive system further comprising an electric drive motor mounted to the base and coupled to the rotating shaft assembly by a drive belt and a pulley; power supplied to the drive system by means of an on/off power switch.

7. The cartridge case preparation device of claim 6, wherein the drive system is equipped with a variable speed control for regulating and coupling the speed of the rotating shaft with a desired function.

8. The cartridge case preparation device of claim 1, wherein the interchangeable body section is configured as a cartridge case trimmer.

9. The cartridge case preparation device of claim 8, wherein the cartridge case trimmer interchangeable body section further comprises:

a first end having a machined face;

a groove being a relief machined into the machined face;

a case trimmer cutting blade adjustably secured into the groove; and a second end having projecting male threads for mating with a threaded recess of the main body shaft, the mating threaded surfaces allowing precise adjustment of the distance between the cartridge case holder assembly and the case trimmer cutting blade.

10. The cartridge case preparation device of claim 9, wherein the case trimmer cutting bit is of carbide, the cutting bit employing three separate cutting surfaces for cutting both inside and outside chambers at once.

11. The cartridge case preparation device of claim 1, wherein the interchangeable body section is configured to remove a staked or swaged portion of a primer pocket.

12. The cartridge case preparation device of claim 11, wherein the primer pocket deswaging interchangeable body section having a tapered cutter blade, the tapered cutter bit being a metal cutting bit used to remove material from a leading edge of a primer pocket recess formed by staking or swaging primer in place, the primer pocket deswaging interchangeable body section further comprising:

a first end;

a tapered cutter blade accepting into the first end; and a second end having projecting male threads for mating with a threaded recess of the main body shaft, the mating threaded surfaces allowing precise adjustment of the distance between the cartridge case holder assembly and the tapered cutter blade.

13. The cartridge case preparation device of claim 1, wherein the interchangeable body section is configured to uniform the size and depth of a cartridge case primer pocket.

14. The cartridge case preparation device of claim 13, wherein the interchangeable body section, configured to uniform the size and depth of a cartridge case primer pocket, further comprising:

a first end;

a straight wall cutter blade accepting into the first end; and a second end having projecting male threads for mating with a threaded recess of the main body shaft, the mating threaded surfaces allowing precise adjustment of the distance between the cartridge case holder assembly and the straight walled cutter blade; the straight walled cutter blade being a metal cutting bit used to remove material from a bottom flat surface of a primary pocket recess of a cartridge case, uniforming the primer pocket.

15. The cartridge case preparation device of claim 1, wherein the interchangeable body section is configured to deburr a flash hole of a cartridge case.

16. The cartridge case preparation device of claim 15, wherein the interchangeable body section configured to deburr internal and external surfaces of a flash hole of a cartridge case, the interchangeable body section further comprising:

a first end;

an accepting recess formed into the first end;

a step profiled cutting bit secured into the accepting recess; and a second end having projecting male threads for mating with a threaded recess of the main body shaft, the mating threaded surfaces allowing precise adjustment of the distance between the cartridge case holder assembly and the step profiled cutting bit; the cutting bit extending into a cartridge case neck and deep into a case body, to contact an inside surface of a primer pocket flash hole, deburring the flash hole.

17. The cartridge case preparation device of claim 1, wherein the interchangeable body section is configured to turn external surfaces of a cartridge case neck.

18. The cartridge case preparation device of claim 17, wherein the interchangeable body section is configured to turn external surfaces of a cartridge case neck, the interchangeable body section further comprising:

a first end having a machined surface;

an accepting recess section formed into the machined surface of the first end;

a case neck pilot being a guide and support for a cartridge case neck, the case neck pilot accepting into the recess section; and an extension piece fixedly attached at one end to a rim portion of the machined surface of the first end, the extension piece further comprising:

a flattened anterior surface;

a top surface perpendicularly and fixedly attached to the anterior surface;

a downwardly-directed hole in the top surface;

a rounded posterior surface perpendicularly and fixedly attached to the top surface;

a rectangular slot in the extension piece, the rectangular slot extending between the anterior surface and the posterior surface, the rectangular slot interconnecting with the downwardly-directed hole in the top surface;

a cutting bit having a recess portion, the cutting bit accepting into and slidably attached to the rectangular slot; and a threaded fastener having a knurled head, the threaded fastener threadably attached to a hole formed in the posterior surface, the threaded fastener securing the cutting bit in place, the knurled head fitting into the recess portion of the cutting bit and further securing the cutting bit in place.

19. The cartridge case preparation device of claim 1, wherein the cylindrical guard being of a clear material and allowing for visual inspection of a process.

20. The cartridge case preparation device of claim 1, wherein the cylindrical guard movable axially down the surface of the cylindrical-shaped body and frictionally held in place over the body; the bowl-shaped relief being exposable for cleaning, maintaining, and adjusting the device; the cylindrical guard remaining in place over the body during cleaning, maintaining and adjusting procedures.

21. A spring-loaded cartridge case holder assembly, for holding a cartridge case, and keeping the cartridge case from contacting a blade when the cartridge case is not touched, and for automatically withdrawing the case from the blade when additional manual force is not applied, the cartridge case holder assembly configured to present a cartridge case mouth towards a cutting action, the cartridge case holder assembly comprising:

a cartridge case, with a cartridge mouth presented to the cartridge case holder assembly;

an outer threaded body having a positive stop face for traveling the cartridge case, the outer threaded body mating at a first end with a cylindrical-shaped body;

an annular groove about the inside of a second end of the outer threaded body;

an inner support chamber having an annular step for limiting the travel of a mouth of a cartridge case, the inner support chamber secured to the second end of the outer threaded body having the annular groove;

a spring biasing the inner support chamber against the outer threaded body; and an internal snap ring securing the inner support chamber inside the outer threaded body.

22. A spring-loaded cartridge case holder assembly, for holding a cartridge case and keeping the cartridge case from contacting a blade when the cartridge case is not touched, and for automatically withdrawing the case from the blade when additional manual force is not applied, the cartridge case holder assembly configured to present a cartridge case head towards a cutting action, the cartridge case holder assembly being internally contoured to match the largest diameter of a cartridge case, the cartridge case holder assembly comprising:

a cartridge case, with a cartridge case head presented to the cartridge case holder assembly;

an outer threaded body having a positive stop face inside its core, for traveling the cartridge case head, the outer threaded body mating at a first end with a cylindrical-shaped body;

an annular groove about the inside of a second end of the outer threaded body;

an inner support chamber having an annular step for limiting the travel of a head of a cartridge case, the inner support chamber secured to the second end of the outer threaded body having the annular groove;

a spring biasing the inner support chamber against the outer threaded body; and an internal snap ring securing the inner support chamber inside the outer threaded body.

* * * * *